May 17, 1966　　　　V. DE P. HAGAN　　　　3,251,484
PORTABLE CONCRETE BATCHING PLANT
Filed Sept. 21, 1964　　　　　　　　　　　　3 Sheets-Sheet 1
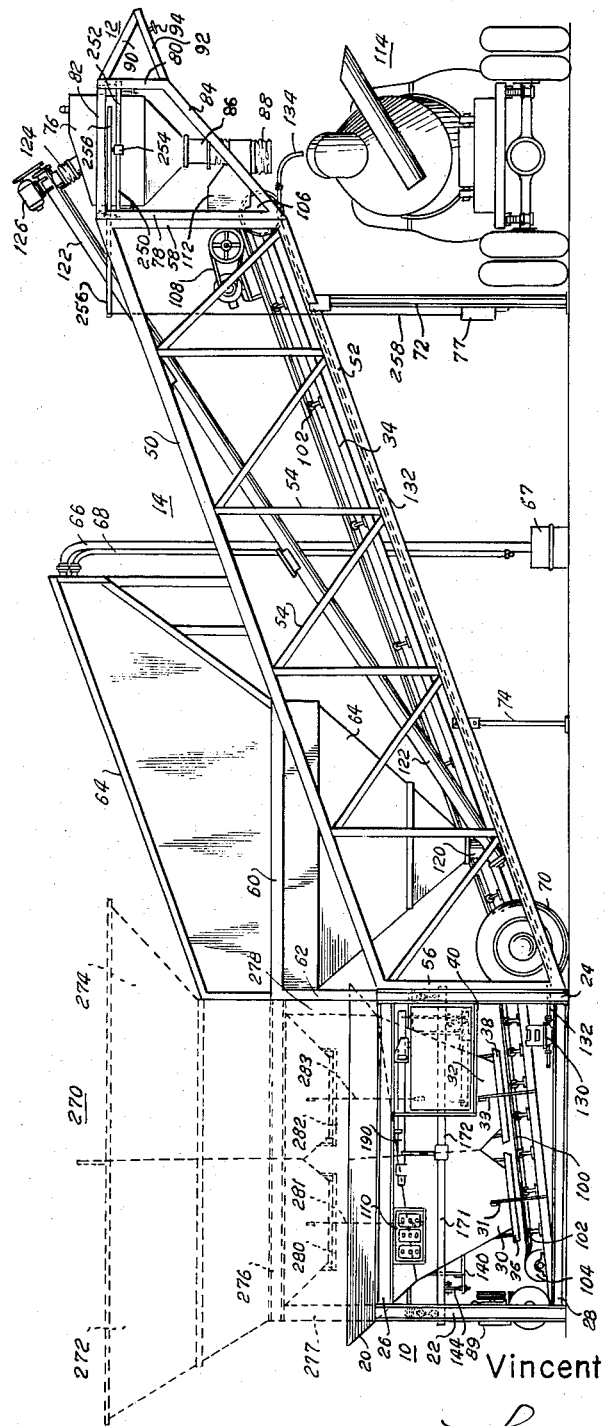
Fig. 1
INVENTOR
Vincent de P. Hagan
BY 
ATTORNEY INVENTOR
Vincent deP. Hagan May 17, 1966 V. DE P. HAGAN 3,251,484
PORTABLE CONCRETE BATCHING PLANT
Filed Sept. 21, 1964 3 Sheets-Sheet 3

INVENTOR
Vincent de P. Hagan
BY Thomas A. Harwood
ATTORNEY

United States Patent Office 3,251,484
Patented May 17, 1966

3,251,484
PORTABLE CONCRETE BATCHING PLANT
Vincent de P. Hagan, 3920 Frontier Lane, Dallas, Tex.
Filed Sept. 21, 1964, Ser. No. 397,718
19 Claims. (Cl. 214—2)

This invention relates generally to concrete batching plants and more particularly to a portable batching plant that can be towed by a vehicle and requires a minimum amount of assembly and disassembly when it is moved from one location to the other.

The inconvenience and cost of installing concrete batching plants at construction sites has become a major time and expense factor to be considered by the contractor. This results from the fact that concrete batching plants are necessarily large and heavy because of the tremendous volumes of concrete required to batched, and include large silos to contain the cement and aggregate to be batched together to form the concrete. Because of the massive structure of such plants, it is conventional practice to lay a concrete foundation on which to install the batching plant to withstand the tremendous weight of the structure. The plant is then assembled on the concrete foundation for operation, including the installation of the bins and batchers and all other required accessory equipment. This installation procedure, including the laying of the concrete foundation at each construction site, is such a major effort that the cost of installing a concrete plant has become a major expense item for the contractor, especially if the plant must be moved often from one construction site to another. Moreover, the transportation of the several component parts of the plant is also costly, especially since the components of conventional concrete plants are not designed for mobility.

The concrete plant of this invention represents a considerable improvement in this area by providing a portable structure that requires an absolute minimum amount of assembly and disassembly in the use and transportation of the plant from one construction site to another. The plant includes all necessary components required of a concrete plant, all of which are carried on a frame-work or truss, wherein the truss is so designed that it can be tilted up at one end by a predetermined angle so that all components are in the operating position. When this end of the plant is tilted down, the plant is in a traveling position. Specifically, the plant comprises a truss or body framework having an aggregate batcher disposed therewithin at one end and a cement batcher disposed therewithin at the other end, with both the cement and aggregate batchers being suspended within the truss by means of weighing scales. The truss or entire framework is so designed that it can be raised at one end until the end thereof within which the aggregate batcher is suspended comes to rest on a level or horizontal, whereas the end of the truss within which the cement batcher is suspended is raised above the ground. Since both the aggregate and cement batchers are suspended within the truss from weighing scales, it is preferred that the support members comprising a part of the truss to which the scales are attached be such that the scales are on a level when the plant is in the tilted-up operating position. This is accomplished in the preferred embodiment of the invention by attaching the scales to support members which are horizontal and level when the plant is in the tilted-up position. Thus the aggregate batcher is suspended by means of its scales from horizontal support members located within the end of the truss which rests on the ground when the plant is in the tilted-up position, and similarly, the cement batcher is suspended by means of its scales from horizontal support members located within the raised end of the truss. The total plant truss is designed to act as a single unit to accomplish this as will be described in detail hereinafter, so that the mere tilting of the plant up at one end by a predetermined angle automatically places both aggregate and cement batchers and their respective scales on a horizontal level in operating position.

Silos for supplying both aggregate and cement to the batchers are provided in the preferred embodiment hereof, and these silos are carried by the truss such that they are automatically placed in a vertical, operating position for discharging their contents when the plant is in the tilted-up position.

Both cement and aggregate are discharged from the bottom of the raised end of the truss into a ready mix truck, wherein aggregate is conveyed by a belt conveyer up the inclined truss of the plant to the raised end. The inclined part of the truss which is intermediate the raised and lowered end is disposed at the proper angle, this being about 18° to the horizontal in the preferred embodiment, so that aggregate of any nature whatsoever will be readily conveyed by the belt conveyer without slippage. A screw conveyer connects the cement silo to the cement batcher and is also oriented at the proper angle when the plant is in the operating position. Therefore, all functional parts of the plant are in the proper operational position when the front end is raised until the base or rear end is horizontal and comes to rest on a level, all of which is accomplished without any assembly whatsoever other than raising the front end. Wheels are provided on the plant so that when the front end of the plant is lowered, the rear end is raised off the ground and all of the weight bears on the wheels, whereby the plant can be towed in this position.

Other objects, features and advantages of the invention will become apparent from the following detailed description thereof when taken in conjunction with the appended claims and the attached drawing wherein like reference numerals refer to like parts throughout the several figures, and in which:

FIGURE 1 is a side elevational view of the portable concrete batching plant of this invention in the tilted up position for operation;

Figure 2:
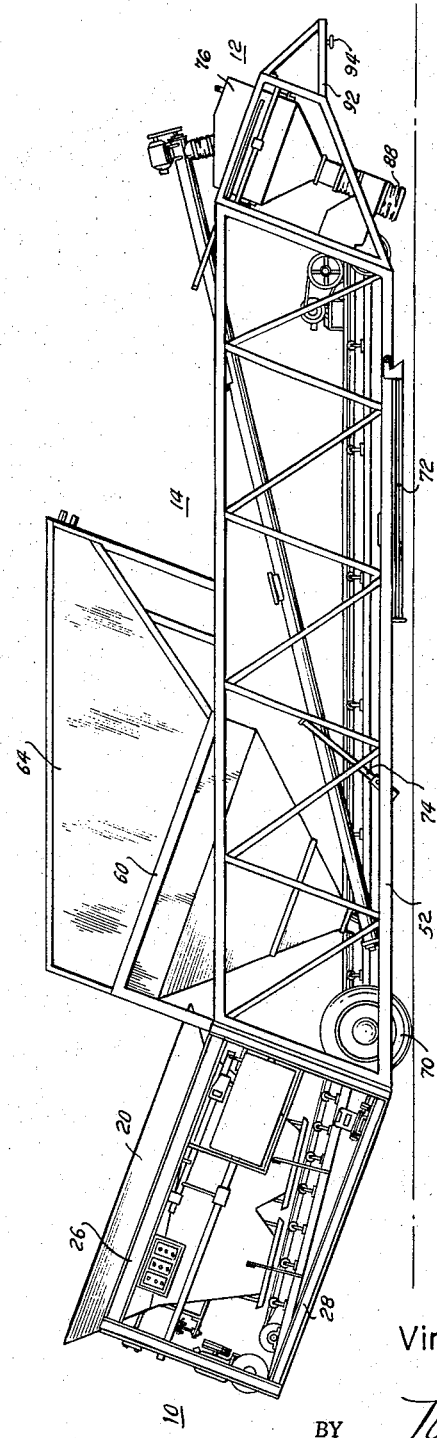
FIGURE 2 is a side elevational view of the plant tilted downward in a traveling position for being towed behind a vehicle.

Referring now to FIGURE 1, there is shown a side elevational view of the portable concrete batching plant of the invention in a tilted up position ready for use. The batching plant comprises an aggregate batcher section generally designated 10 forming the rear portion of the plant, a cement batcher section generally designated 12 forming the front portion of the plant, and an intermediate section generally designated 14 separating and joined at its opposite ends to the aggregate and cement batcher sections. The aggregate batcher section includes an aggregate batcher 20 comprised of separate batchers or compartments 30 and 32 which contain gravel and sand, respectively, or vice versa. The batcher is vertical in the position shown and each compartment has slanted walls to cause the aggregate to flow to the bottom thereof to be discharged by gates 36 and 38 forming the bottom of the compartments 30 and 32, respectively. A suitable lever 31 is provided to the compartment 30 for opening and closing gate 36 in the bottom thereof to discharge the contents therefrom. Similarly, compartment 32 includes a suitable lever 33 for providing a similar function. The batcher 20 is disposed within the aggregate frame assembly, the latter of which is comprised of vertical frame members 22 and 24 on one side connected at the tops and bottoms thereof by horizontal frame members 26 and 28 to form one side. Similar vertical and horizontal frame members form the other side of the assembly, with additional horizontal frame members connecting the two sides, all of which generally form a box structure. The aggregate batcher 20 is supported indirectly within the aggregate frame assembly by means of scales for weighing the batcher and its contents, wherein the aggregate batcher 20 is suspended directly from the scales and the scales are suspended directly from the aggregate frame assembly, all as will be described in detail hereinafter. It will be pointed out at this time, however, that the scales are preferably suspended from horizontal frame members connected between the two sides of the assembly with the batcher being disposed between the two sides and suspended from the scales. The batcher is vertical in this position and causes no lateral forces to be exerted on the scales that would otherwise cause the scales to indicate an erroneous weight. That is to say, the frame members to which the scales are suspended are exactly horizontal when the plant is in the tilted up and operating position as shown. Thus the aggregate batcher 20 is suspended vertically from the scales. A scale box 40 is attached by any suitable means to the side of the aggregate frame assembly for weighing the desired amount of aggregate to be discharged from the sand and gravel compartments.

Rigidly attached to the front end of the aggregate frame assembly is an intermediate frame assembly generally designated 14 which comprises a bridge type chassis inclined with respect to the aggregate frame assembly and to the horizontal when the plant is in the operating position shown in FIGURE 1. This chassis includes frame members 50 and 52 extending the length of the chassis and connected by intermediate structural members 54, including end members 56 and 58 which are vertical in the position of the plant, as shown, all of which forms one side of the intermediate frame assembly 14. Similar structure forms the other side of the assembly and is connected to the side shown by means of suitable horizontal members, not shown. Rigidly attached to the top of the assembly and at the rear thereof is another frame assembly comprised of horizontal frame member 60 and vertical frame member 62, attached thereto, and similar frame members on the opposite side thereof, all of which support a cement silo 64 disposed therewithin and rigidly attached thereto. The silo is closed at its top and has slanted walls to cause the cement to flow to a bottom outlet 120. A detachable air vent pipe 66 is connected at one end in communication with the interior of the silo to vent the dust created during the filling and discharge of the cement in the silo, and at the other end to a water tank 67 to collect the dust. A detachable fill pipe 68 is also connected to the silo to fill the silo with cement under pressure. Dual wheels 70 and an axle, not shown, are attached to the lower rear portion of the intermediate assembly 14, whereby the wheels just touch the ground with essentially no weight thereon when the plant is in the operating position, as shown. The batching plant is held in the tilted up position by means of suitably spaced supporting struts 72 and 74 connected at one end to the lower part of the frame assembly 14, with the other ends of the struts resting on the ground. Rigidly attached to the front end of the intermediate frame assembly is a cement batcher assembly generally designated 12, which includes a cement batcher 76 disposed within the cement batcher frame assembly. This frame assembly is comprised of vertical frame members 78 and 80 connected at their upper ends by horizontal member 82 and at their lower ends by an inclined member 84, all of which forms one side of the assembly. Similar members form the other side of the assembly and are connected to the side shown by additional horizontal members. The cement batcher 76 is also suspended within the cement frame assembly by means of weighing scales similar to that previously described in conjunction with the aggregate batcher, all of which will be described below. Like the aggregate batcher and frame assembly, the cement batcher and frame assembly is preferably disposed in a horizontal position when the plant is in its tilted up position for operation as shown so that the cement batcher 76 is likewise suspended vertically from its scales to preclude lateral forces from being exerted on the scales. A cement scale box 77 is attached to the supporting strut 72 for weighing the amount of cement contained within the batcher 76. The walls of the cement batcher are also slanted to cause the flow of cement to the bottom thereof into a gate 86, the latter of which controllably discharges cement into a ready mix discharge hood 88 disposed beneath the batcher. The gate is well known and comprises a rotary valve actuated by an air ram, the latter of which is controlled by an air compressor motor and air valve 89 located on the rear of the aggregate frame assembly by means of air lines, not shown.

Another gooseneck frame assembly comprised of members 90 and 92 on one side and similar members on the other side is attached to the front of the cement frame assembly, with a king pin 94 provided thereon for connection to a fifth wheel on a towing vehicle when the plant is tilted in its down position for mobility.

Disposed beneath the aggregate batcher 20 and along the length of the intermediate frame assembly 14 is a troughing belt conveyer that includes a conveyer belt 100 which rides on suitable roller bearings 102 and passes over idler wheels 104 and 106. A suitable motor system 108 is provided for driving the belt conveyer and is controlled by a master control box 110 mounted on the aggregate frame assembly. Disposed at the top end of the conveyer belt and located within the cement batcher frame assembly is a trough 112 into which the contents of the conveyer are dumped as it passes over the idler wheel 106, whereby it is then passed into the discharge hood 88. As the sand and gravel comprising the aggregate is released from the aggregate batchers by means of levers 31 and 33 through gates 36 and 38 onto the conveyer belt 100, it is conveyed to the trough 112 for discharge from the bottom of the cement batcher assembly into a ready mix truck 114, for example. The angle which the conveyer belt 100 makes with the horizontal is slightly greater than the angle the intermediate frame assembly makes so that the aggregate will be discharged slightly above the discharge hood to prevent it from backing up. Disposed within the intermediate frame assembly 14 and connected at its lower end to the bottom outlet 120 of the cement silo 64 is an enclosed feeder screw type conveyer 122, which is connected at its other end to the top port or inlet 124 of the cement batcher 76. The bottom of the silo is displaced laterally from the bottom of the aggregate batcher, as is the cement conveyer from the belt conveyer, so that the cement conveyer does not obstruct the path of the belt conveyer. A suitable motor system 126 is provided on the screw type conveyer for rotating same and is controlled through the master panel 110. The angle that the screw type conveyer 122 makes with the horizontal is also slightly greater than the angle made by the frame assembly 14 in order to deliver the cement from the silo to the top of the cement batcher. In one preferred embodiment the angle the intermediate frame assembly makes with the horizontal is 18°, the angle the belt conveyer makes is 20°, and the angle the cement screw conveyer makes is 25°. An automatic water meter 130 for being connected to any suitable water source is provided on the aggregate frame assembly and is connected to a water pipe 132 which runs along the length of the intermediate frame assembly 14 and terminates at an outlet 134 projecting downward below the bottom of the cement batcher assembly for discharging water into the transit mixer 114.

The plant is operated with the plant operator standing in front of the aggregate scale box 40 and electrical control panel 110. Prior to starting the operation, the compartments 30 and 32 are filled with gravel and sand, respectively, by any suitable means, such as by using a front end loader, for example, or by discharging aggregate from an additional aggregate sand and gravel silo to be described hereinafter. The amount of sand and gravel contained within the compartments is immaterial so long as a sufficient quantity is present, as a draw-off weighing technique is used to determine how much of the aggregate is discharged onto the conveyer, all as will be described. Similarly, the cement silo 64 is filled through the fill pipe 68, with the exact amount of cement contained therein being immaterial. The plant operator has preexisting knowledge of the exact amounts of aggregate, cement, and water to be discharged by the plant into the ready mix truck 114. The scales suspending the cement batcher 76 are initially set when the hopper or batcher is empty and is set equal to the weight of the cement hopper plus the amount of cement to be discharged into the truck 114. Thus the scales will balance when the exact amount of cement has been transferred from the silo 64 to the batcher 76, wherein the scales are such as to automatically cut off the feeder screw motor 126 when the prescribed amount of cement has been transferred. The weighing scales for the aggregate batcher are balanced when the compartments 30 and 32 are loaded with an undetermined amount of sand and gravel. After balancing, however, the operator sets the scales for the amounts of sand and gravel, respectively, that is to be drawn off, which unbalances the scales. In discharging the sand and gravel from the compartments, the operator opens the gates 36 and 38 by levers 31 and 33, separately, until the scales balance for the respective compartments, thus utilizing a draw-off weighing technique. The operator pushes the starter button on the control panel, which is now connected to a suitable power supply, to actuate the cement screw conveyer which discharges cement from the silo into the cement batcher until the prescribed amount of cement in weight is contained therein, at which time the cement scales automatically cuts off the conveyer motor 126. The operator then pushes another button to actuate the air valve and ram 86 disposed below the cement batcher and starts discharging cement from the batcher into the ready mix truck through the hood 88. Immediately thereafter, the operator draws off the preselected amounts of sand and gravel by opening each gate separately as the trough conveyer conveys the aggregate up the intermediate chassis assembly into chute 112, where it is also dumped into the mixer truck via hood 88. The operator simultaneously or immediately thereafter starts the automatic water meter, which is now connected to a water source, to discharge the preselected amount of water into the mixer truck, which completes the filling operation.

To ready the batcher plant for moving from one location to another, metal shims, to be described below, are inserted between the aggregate batcher and various members of the aggregate frame assembly, and the aggregate batcher is then tightened against the shims to secure the batcher in a fixed position relative to the frame assembly. This transfers the batcher weight to the chassis rather than to the scales, so that the scales will be free of any impact load when traveling and to prevent the batcher from moving laterally when it is tilted to the down position for traveling. Shims are similarly inserted between the cement batcher 76 and its corresponding frame assembly to take the load off the cement scales. The vent pipe 66 and fill pipe 68 are detached from the cement silo 64, the plant support struts 72 and 74 are folded into the chassis, and the plant is then tilted over forward, all as shown in FIGURE 2. As the plant is tilted over, the dual wheels 70 contact the ground and the aggregate batching assembly 10 is tilted upward at the rear of the plant, with the cement batching assembly 12 being tilted downward at the front of the plant. The plant is then attached to a towing vehicle by means of the kingpin 94 and towed in this position, whereby the intermediate frame assembly 14 is substantially horizontal to the ground. From the foregoing description, it is apparent that the proper operating and traveling positions shown in FIGURES 1 and 2, respectively, are made possible by the fact that the intermediate frame assembly 14 is attached at its opposite end in inclined relation to the aggregate and cement batcher assemblies, respectively, whereby the aggregate and cement batcher assemblies are substantially parallel to each other and parallel to the ground when the plant is in its tilted up, operating position.

Figure 3:
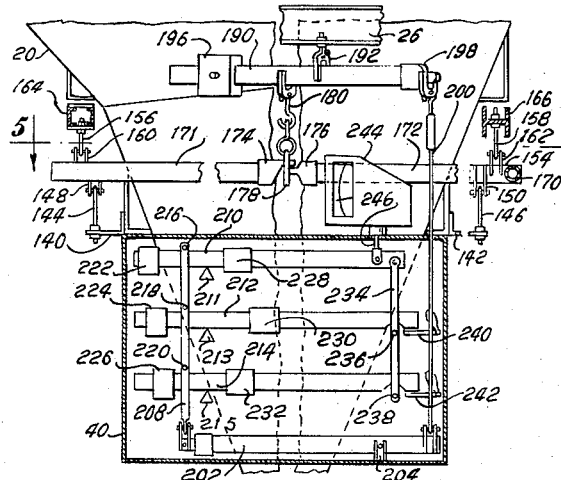
FIGURE 3 is a side elevational view of a batcher suspended from weighing scales for weighing the batcher and its contents.

Although the weighing scales do not, in and of themselves, form a part of the invention, a description will be given to show in more detail how the batchers are suspended from the frame assemblies by means of these scales, including a description of the operation of the scales, because of the importance attached to the fact that the aggregate and cement batcher asemblies are substantially horizontal when in the operating position. As stated earlier, this allows the weight of the aggregate and cement batchers to be exerted vertically on their respective scales to provide accurate readings. One embodiment of a scales system that can be used in conjunction with the batchers is shown in the following FIGURES 3–5. Referring specifically to FIGURE 3, there is shown an elevational view, partly in section, of a batcher suspended from a suitable scales system, the latter of which is suspended to the corresponding frame assembly. It should be understood that the dimensions of the various components shown in these figures are not necessarily drawn to scale in order that all of the component parts can be shown with clarity. Attached to the two sides of the batcher 20 are laterally extending angle brackets or angle iron members 140 and 142. Securely attached to the angle bracket 142 near its two ends are J-bolts 146 and 147, respectively, as shown more clearly in the end elevational view of FIGURE 4. Hereinafter, the J-bolts will be referred to as hooks. Similarly, attached to angle bracket 140 are another pair of hooks, wherein only hook 144 is shown. These hooks are inserted at their top ends through linkages. As shown in the cutaway portion of FIGURE 3 on the right side thereof, hook 146 is inserted through a linkage 150, the latter of which is rigidly attached to one end of an arm 154. The arm is rigidly attached at its other end to a pipe or rod 170 which extends laterally across the end of the batcher. Another linkage 162 is rigidly attached to the arm intermediate the linkage 150 and rod 170, whereby another hook 158 is inserted through linkage 162. The hook 158 is rigidly attached at its upper end to one of the horizontal members 166 which comprises the batcher frame assembly. It is apparent that the rod 170 and arm 154 are suspended by the two hooks and linkages, with the batcher also being suspended from the frame assembly. The weight of the batcher creates a couple tending to rotate the end of the arm at which linkage 150 is attached downward by an amount proportional to the batcher weight.

Figure 4:
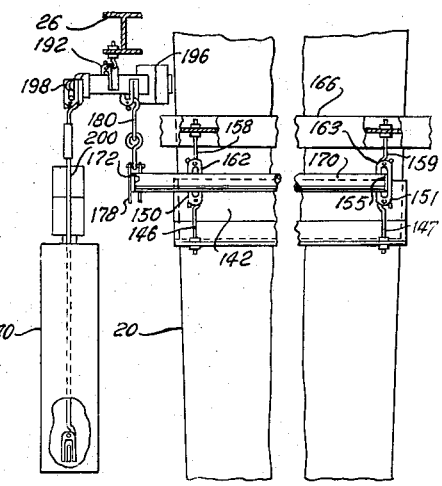
FIGURE 4 is a fragmentary end view of the batcher and scales shown in FIGURE 3.
Figure 5:
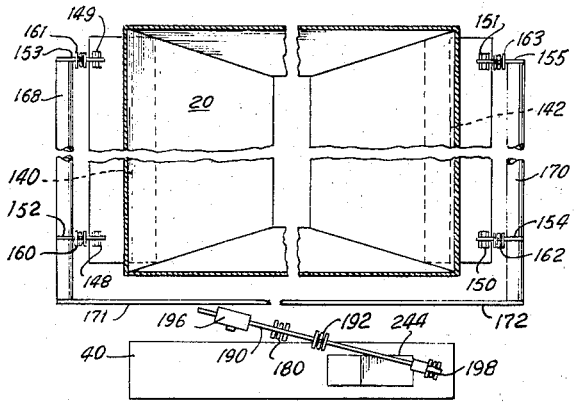
FIGURE 5 is a fragmentary top view of the batcher and scales shown in FIGURE 3.

There are two such suspension asemblies on each side of the batcher, wherein the two or one end are shown in the end view of FIGURE 4. The suspension assembly just described is located on one end of the batcher near a corner thereof. The other suspension assembly is located near the other corner of the batcher on this side and, like the first assembly, comprises a first hook 147 attached at one end to the angle bracket 142 and inserted at its other end through a linkage 151, the latter of which is rigidly attached to one end of another arm 155 as shown in the top view of FIGURE 5. Another hook 159 is inserted at its lower end through another linkage 163 located intermediate linkage 151 and the rod 170, with the top end of hook 159 being rigidly attached to the same frame member 166.

Similar suspension assemblies are provided near the other two corners of the batcher on the other side, only one of which is shown in the side view of FIGURE 3. As shown, a hook 144 is rigidly attached at its lower end to an angle bracket 140, which extends laterally across the end of the batcher, and is inserted at its top or hook end through a linkage 148. This linkage is rigidly attached to one end of an arm 152 (shown in FIGURE 5), with the arm being rigidly attached at its other end to another rod 168 extending laterally across the end of the batcher. Rigidly connected to the arm intermediate the rod and first linkage is another linkage 160 through which the lower end of a hook 156 is inserted. This hook is rigidly attached at its upper end to another horizontal member 164 comprising a part of the batcher frame assembly. Finally, a similar suspension assembly is provided near the fourth corner of the batcher. It should be noted that all of the hooks can rotate and swivel within their respective linkages so that the batcher raises and lowers within the scale suspension assembly according to its weight. It will also be noted at this time that the batcher walls clear the horizontal frame members 164 and 166 by only a slight amount, whereby shims can be inserted between the batcher and frame members with the two being secured together when the plant is moved, all as will be described below.

Rigidly attached at their ends to the two rods 168 and 170, respectively, are two splice levers 171 and 172, with the other ends 174 and 176 of these levers being inserted through a linkage 178. This linkage is connected at its top end with a hook and linkage 180, the latter of which is connected to a transverse lever 190, with the lever 190 being suspended from another horibontal frame member, such as member 26 shown in FIGURE 1. A counterweight 196 is slideably engaged on one end of the lever 190, and the other end 198 of the lever is inserted through a vertical linkage and rod 200, the latter of which extends down into the scale beam box 40 on one end thereof. Another transverse lever 202 is pivotally attached to the bottom of the beam box by pivot 204, with one end thereof being engaged with the bottom of the rod 200 through a suitable linkage. The other end of lever 202 is connected at its other end by means of a suitable linkage to a mechanical linkage 208 which extends up into the box on either side of a plurality of batching beams 210, 212 and 214. The three beams are fulcrumed over knife pivots 211, 213 and 215, respectively, and have counterweights 222, 224 and 226, respectively, slidably engaged on their left ends as shown. Measuring weights 228, 230 and 232 are slidably engaged on the three beams, respectively, on the opposite sides of the pivots. The mechanical linkage 208 engages the top of beam 210 by means of a cross-bar 216 (shown on end), which exerts a downward torque on the beam about pivot 211 in response to the left end of lever 202 being moved downward. Similarly, crossbars 218 and 220 forming a part of linkage 208 engages the tops of beams 212 and 214, respectively, when the latter are released by their respective locks as will be described below. The end of beam 210 is connected to a weight indicator 244 by a cable 246 or other suitable means, wherein the indicator has a pointer and scale with a null balance indication. Also attached to the end of beam 210 is another mechanical linkage 234 depending therefrom with crossbars 236 and 238 for engaging the bottoms of weight beams 212 and 214 when the latter are unlocked. Trig locks 240 and 242 are attached to the beam box for engaging the ends of beams 212 and 214, respectively. When the trig lock is released for a particular weight beam, the beam comes to rest at one end on the crossbar of linkage 234 and pulls down on beam 210 with a force depending upon the distance of the measuring weight from the pivot. The other end of the weight beam is engaged by one of the crossbars on linkage 208, the latter of which acts down on the beam to produce a torque about the beam pivot opposite that produced by the measuring weight. When a particular weight beam is locked, however, it is removed from the crossbars of the two linkages 208 and 234 and does not exert any force or torque on the rest of the system.

All of the levers and weights previously described are predetermined insofar as the various lengths of the levers and weights required to produce a system which is balanced, all of which is well known. To facilitate the mounting of the beam box in almost any desired location relative to the batcher suspension system, the transverse lever 190 can rotate on its swivels through an angle of 360° in a plane perpendicular to the plane of the drawing of FIGURE 3, so that the linkage rod 200 can be inserted in through the top of beam box 40 regardless of its location.

To illustrate the draw-off weighing technique, the gravel and sand batchers 30 and 32, respectively, are filled with an undetermined weight of aggregate. To discharge a preselected weight of gravel, for example, into the belt conveyer, the measuring weight on one of the weight beams 212 and 214 (the particular one being immaterial), is set at the preselected weight to be drawn off, which weight will be less than the combined weights of the two batchers and their contents. The trig lock on this particular weight beam is then released (the other weight beam being locked) to act downward on the right end of the tare beam 210. Since the batcher and aggregate weight is greater than the preselected weight set on the weight beam, the right ends of the tare beam 210 and the weight beam being used will be raised because of the opposite torque exerted downward on their left ends by linkage 208 and lever 202. This produces a non-balanced reading on the scale dials 244. Then, weight 228 on the tare beam 210 is adjusted until the scale dials are nulled and balanced. Subsequently, the weight beam being used is again locked, thus causing the right end of the tare beam to raise and indicate an unbalanced condition on the scale dials. An amount of aggregate, such as gravel, is then drawn off until the scale dials again balance, wherein the exact weight of gravel is drawn off as set on the weight beam used. To draw off a preselected amount of sand, the weight on the other weight beam is set simultaneously with the first weight beam, and both of their locks are released. The system is then balanced with weight 228 on the tare beam, and then, one of the weight beams is again locked. The particular aggregate corresponding to this beam is then released until the system is again balanced. Subsequently, the second weight beam is again locked, and its particular aggregate is drawn off until the system rebalances.

The suspension and lever system for the cement batcher 76 is similar to that just described, except that the beam box 77 is located on the supporting strut 72 for easy access by the operator. As shown in FIGURE 1, a transverse lever 256, corresponding to transverse lever 190 for the aggregate batcher, extends over the cement beam box from the two splice levers 250 and 252 connected to the suspension system, with the lever 256 being suspended from a suitable horizontal frame member, such as member 82. A suitable linkage or cable 258 connects the end of lever 256 with the beam box 77. Instead of a draw-off weighing technique, the weights in the beam box are set equal to the preselected weight of cement to be used when the cement batcher is empty. Cement is then transferred from the silo to the batcher until the scales balance, at which time, the cement screw conveyer is automatically cut off.

Figure 6:
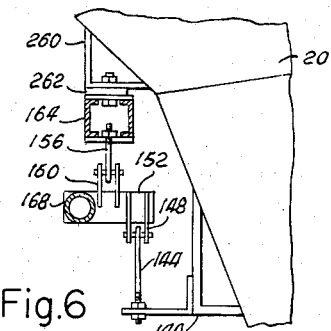
FIGURE 6 is an elevational view of a batcher, partly cutaway and partly in section, showing in more detail the manner in which the batcher is suspended from its frame assembly, including a shim for tightening the batcher against the frame for moving.

When the plant is to be moved, suitable shims are used to secure the aggregate and cement batchers to their respective frame members to free the scales from forces and stresses that would be exerted thereon during moving. This is desirable since, in the towing position, the batchers are tilted at an angle and would move sideways, whereas the intermediate frame assembly is horizontal, all as shown in FIGURE 2. Means for securing the batcher is shown in FIGURE 6. Another bracket 260 is provided to the wall of the batcher extending laterally across its end just above the horizontal frame member 164, such as for the aggregate batcher. A shim 262 is then inserted between the bracket 260 and member 164 and bolted to each, thus securing the batcher directly to the frame assembly and freeing the scales from all undesirable forces. Similar shims are used on the other end, and the cement batcher is similarly secured. It should be noted that any suitable means can be used to secure the batchers, wherein the foregoing represents one example only.

It is often desirable to provide aggregate storage bins on the plant to supply the aggregate batchers to eliminate the necessity of loading of the batchers by other means, such as would be required by a front end loader, for example. A suitable storage bin 270 is shown in dashed lines in FIGURE 1, and comprises two compartments 272 and 274 for gravel and sand, respectively, mounted above the gravel and sand batcher compartments on a suitable frame assembly. The frame assembly is attached to the top of the batcher frame assembly and comprises vertical beams 277 and 278 connected at the tops by horizontal beam 276, and similar structural members forming the other side. Gates 280 and 282 are provided at the bottoms of compartments 272 and 274, respectively, and are disposed directly over the tops of the gravel and sand batchers 30 and 32, respectively, wherein the gates are operated by suitable levers 281 and 283. The storage container 270 is normally quite large and holds considerably more aggregate than the batchers, so that constant reloading is not required.

Figure 7:
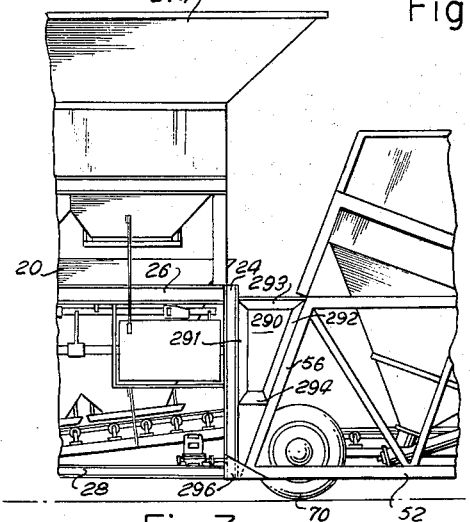
FIGURE 7 is a side elevational view of a portion of the plant shown in FIGURE 1 illustrating another embodiment of the invention.

Because of the increased height imposed by the storage container, it will project above the rest of the plant by a considerable amount when the plant is tilted for towing. To maintain the highest point of the plant below a predetermined maximum height for towing, a further embodiment of the plant is provided as shown in the fragmentary, side elevational view of FIGURE 7. In this embodiment, the batcher frame assembly 10 is either detachable or pivotally connected at the bottom to the intermediate frame assembly 14. For towing, these two assemblies are separated and a wedge shaped frame assembly 290 is inserted between the two. The assembly 290 is of any suitable construction, such as shown by horizontal members 293 and 294 connected with vertical and slanted members 291 and 292 to form one side thereof. Similar members form the other side with horizontal members connecting the two sides. Preferably, front member 292 makes the same angle with vertical member 291 as does the intermediate frame assembly with the two batcher assemblies when in the operating position, so that when the wedge assembly is bolted or secured between the aggregate batcher assembly and intermediate frame assembly, both of the latter are horizontal. This leaves the top of the aggregate storage container at the same height for towing as for the operating position, whereas its height would be considerably increased if tilted upward.

Although the invention has been described in detail with reference to preferred embodiments thereof, it is understood that certain modifications and substitutions that do not depart from the true scope of the invention will become apparent to those skilled in the art. Accordingly, it is intended that the invention be limited only as defined in the appended claims.

What is claimed is:

1. A portable concrete batching plant comprising:
   (a) a first frame assembly,
   (b) a first batcher disposed within said first frame assembly,
   (c) a second frame assembly,
   (d) a second batcher disposed within said second frame assembly,
   (e) a third frame assembly disposed between said first and said second frame assemblies and rigidly attached at opposite ends thereof to said first and said second frame assemblies, respectively, and
   (f) wheels attached to said third frame assembly for transporting said plant along a surface,
   (g) said plant being pivotable in one direction to establish a first operating position with the weight of said first frame assembly being substantially supported by said surface and said third frame assembly being inclined to elevate said second frame assembly and the bottom thereof above said surface, and pivotable in an opposite direction to establish a second traveling position with all of said first, said second and said third frame assemblies being carried by said wheels above said surface.

2. A portable concrete batching plant according to claim 1 wherein said first batcher is adapted for containing aggregate, and said second batcher is adapted for containing cement.

3. A portable concrete batching plant according to claim 1 including a cement storage container disposed within said third frame assembly.

4. A portable concrete batching plant according to claim 2 including a cement storage container disposed within said third frame assembly, first means disposed along said third frame assembly for conveying cement contained within said container to said second batcher, and second means disposed along said third frame assembly for conveying aggregate contained within said first batcher to said second frame assembly to be discharged from the bottom thereof.

5. A portable concrete batching plant according to claim 4 including third means disposed along said third frame assembly for conveying water from said first frame assembly to said second frame assembly to be discharged from the bottom thereof.

6. A portable concrete batching plant according to claim 1 including first and second weighing means disposed within said first and said second frame assemblies, respectively, for weighing said first and said second batchers, respectively.

7. A portable concrete batching plant comprising:
   (a) a first frame assembly,
   (b) an aggregate batcher disposed within said first frame assembly,
   (c) first weighing means attached to said first frame assembly and said aggregate batcher and suspending said aggregate batcher within said first frame assembly for weighing said aggregate batcher,
   (d) a second frame assembly,
   (e) a cement batcher disposed within said second frame assembly,
   (f) second weighing means attached to said second frame assembly and said cement batcher and suspending said cement batcher within said second frame assembly for weighing said cement batcher,
   (g) a third frame assembly disposed between said first and said second frame assemblies and rigidly attached at opposite ends thereof to said first and said second frame assemblies, respectively, (h) wheels attached to said third frame assembly for transporting said plant along a surface, (i) said plant being pivotable in one direction about the axis of said wheels to establish a first operating position with the weight of said first frame assembly being substantially supported by said surface and said third frame assembly being inclined to elevate said second frame assembly and the bottom thereof above said surface, and pivotable in an opposite direction about said axis to establish a second traveling position with all of said first, said second and said third frame assemblies being carried by said wheels above said surface, (j) said aggregate batcher and said cement batcher being suspended by said first and said second weighing means, respectively, in said first operating position so as to exert no substantial lateral forces on said first and said second weighing means, (k) valve means for discharging cement contained in said cement batcher from the bottom of said second frame assembly, and (l) first conveyer means disposed along said third frame assembly for conveying aggregate contained within said aggregate batcher to said second frame assembly to be discharged from the bottom thereof.

8. A portable concrete batching plant according to claim 7 wherein each of said first and said second weighing means are attached to structural members of said first and said second frame assemblies, respectively, which are horizontal when said plant is established in said operating position.

9. A portable concrete batching plant according to claim 7 including a cement storage container disposed within said third frame assembly, and second conveyer means disposed along said third frame assembly for conveying cement contained in said storage container to said cement batcher.

10. A portable concrete batching plant according to claim 7 including means for conveying water from said first frame assembly to said second frame assembly to be discharged from the bottom thereof.

11. A portable concrete batching plant according to claim 7 wherein said first conveyer means extends below the bottom of said aggregate batcher, said aggregate batcher includes gate means for drawing off aggregate into said first conveyer means, and said first weighing means is adapted to weigh the amount of said aggregate drawn off by said gate means.

12. A portable concrete batching plant according to claim 7 including support means for being disposed between an elevated part of said plant and said surface for supporting said plant in said first operating position.

13. A portable concrete batching plant according to claim 7 including hitch means attached to said second frame assembly opposite said third frame assembly for being connected to a towing vehicle when said plant is in said second traveling position.

14. A portable concrete batching plant according to claim 7 wherein said aggregate batcher comprises first and second compartments for containing sand and gravel, respectively, and first and second gate means for discharging the contents of said first and said second compartments, respectively, into said first conveyer means.

15. A portable concrete batching plant according to claim 14 wherein said first weighing means is adapted to weigh the amounts of said sand and said gravel discharged into said first conveyer means.

16. A portable concrete batching plant comprising:
(a) a first frame assembly,
(b) an aggregate batcher disposed within said first frame assembly and including first and second compartments for containing sand and gravel, respectively, and first and second gate means for discharging the contents of said first and said second compartments from the bottom thereof,
(c) first weighing means attached to said first frame assembly and said aggregate batcher and suspending said aggregate batcher within said first frame assembly for weighing said aggregate batcher,
(d) a second frame assembly,
(e) a cement batcher disposed within said second frame assembly,
(f) second weighing means attached to said second frame assembly and said cement batcher and suspending said cement batcher within said second frame assembly for weighing said cement batcher,
(g) a third frame assembly disposed between said first and said second frame assemblies and rigidly attached at opposite ends thereof to said first and said second frame assemblies, respectively,
(h) wheels attached to said third frame assembly for transporting said plant along a surface,
(i) said plant being pivotable in one direction about the axis of said wheels to establish a first operating position with the weight of said first frame assembly being substantially supported by said surface and said third frame assembly being inclined to elevate said second frame assembly and the bottom thereof above said surface, and pivotable in an opposite direction about said axis to establish a second traveling position with all of said first, said second and said third frame assemblies being carried by said wheels above said surface,
(j) said first and said second weighing means being attached to structural members of said first and said second frame assemblies, respectively, which are horizontal when said plant is established in said operating position,
(k) said first weighing means adapted to weigh the amounts of said sand and gravel discharged therefrom,
(l) valve means for discharging cement contained in said cement batcher from the bottom of said second frame assembly,
(m) a cement storage container disposed within said third frame assembly,
(n) first conveyer means disposed along said third frame assembly and extending below said aggregate batcher for conveying aggregate discharged from said aggregate batcher to said second frame assembly to be discharged from the bottom thereof,
(o) second conveyer means disposed along said third frame assembly for conveying cement contained in said cement storage container to said cement batcher,
(p) means for conveying water from said first frame assembly to said second frame assembly to be discharged from the bottom thereof, and
(q) support means for being disposed between an elevated part of said plant and said surface for supporting said plant in said operating position.

17. A portable concrete batching plant according to claim 7 including an aggregate storage container disposed above said aggregate batcher and being supported by said first frame assembly.

18. A portable cement batching plant comprising:
(a) a first frame assembly,
(b) an aggregate batcher disposed within said first frame assembly,
(c) first weighing means attached to said first frame assembly and said aggregate batcher and suspending said aggregate batcher within said first frame assembly for weighing said aggregate batcher,
(d) a second frame assembly
(e) a cement batcher disposed within said second frame assembly,
(f) second weighing means attached to said second frame assembly and said cement batcher and suspending said aggregate batcher within said second frame assembly for weighing said cement batcher, (g) a third frame assembly rigidly attached at one end to said second frame assembly and adapted for being detachably secured at the other end to one end of said first frame asesmbly,
(h) wheels attached to said third frame assembly for transporting said plant along a surface,
(i) a fourth frame assembly adapted for being detachably secured at one end to said one end of said first frame assembly and at the other end to said other end of said third frame assembly when said third frame assembly is detached from said first frame assembly,
(j) said second and said third frame assemblies being pivotable in one direction about the axis of said wheels to establish a first operating position when said third frame assembly is attached to said first frame assembly with said first frame assembly being substantially supported by said surface and said third frame assembly being inclined to elevate said second frame assembly and the bottom thereof above said surface, and pivotable in an opposite direction about said axis to establish a second traveling position when said third frame assembly is detached from said first frame assembly and said fourth frame assembly is attached at its opposite ends to said one end and said other end of said first and said third frame assemblies, respectively, with all of said first, said second, said third and said fourth frame assemblies being carried by said wheels above said surface,
(k) said first and said second weighing means being attached to structural members of said first and said second frame assemblies, respectively, which are horizontal when said plant is established in said operating position,
(l) said first weighing means adapted to weigh the amounts of said sand and gravel discharged therefrom, and
(m) conveyer means disposed along said third frame assembly for conveying aggregate contained within said aggregate batcher to said second frame assembly to be discharged from the bottom thereof.

19. A portable concrete batching plant according to claim 1 including first and second weighing means disposed within said first and said second frame assemblies, respectively, for suspending said first and said second batchers, respectively, said first and said second batchers being suspended by said first and said second weighing means, respectively, in said first operating position so as to exert no substantial lateral forces on said first and said second weighing means.

References Cited by the Examiner

UNITED STATES PATENTS

| | | | |
|---|---|---|---|
| 2,310,592 | 2/1943 | Noble | 214—2 |
| 2,687,285 | 8/1954 | Fisher | 214—2 X |
| 2,975,884 | 3/1961 | Kayser | 214—2 X |
| 3,024,930 | 3/1962 | Sims | 214—2 X |
| 3,064,832 | 11/1962 | Heltzel | 214—2 X |
| 3,090,501 | 5/1963 | Auld | 214—2 |
| 3,154,202 | 10/1964 | Heltzel | 214—2 |

MARVIN A. CHAMPION, *Primary Examiner.*

MORRIS TEMIN, GERALD M. FORLENZA,
*Examiner.*